United States Patent
Li et al.

(10) Patent No.: US 11,575,890 B2
(45) Date of Patent: Feb. 7, 2023

(54) IMAGE ENCODING/DECODING METHOD AND DEVICE FOR SIGNALING FILTER INFORMATION ON BASIS OF CHROMA FORMAT, AND METHOD FOR TRANSMITTING BITSTREAM

(71) Applicant: LG Electronics Inc., Seoul (KR)

(72) Inventors: Ling Li, Seoul (KR); Jung Hak Nam, Seoul (KR); Jaehyun Lim, Seoul (KR); Jin Heo, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/611,708

(22) PCT Filed: May 18, 2020

(86) PCT No.: PCT/KR2020/006486
§ 371 (c)(1),
(2) Date: Nov. 16, 2021

(87) PCT Pub. No.: WO2020/231238
PCT Pub. Date: Nov. 19, 2020

(65) Prior Publication Data
US 2022/0239907 A1 Jul. 28, 2022

Related U.S. Application Data

(60) Provisional application No. 62/849,141, filed on May 16, 2019.

(51) Int. Cl.
*H04N 19/117* (2014.01)
*H04N 19/82* (2014.01)
(Continued)

(52) U.S. Cl.
CPC ......... *H04N 19/117* (2014.11); *H04N 19/186* (2014.11); *H04N 19/423* (2014.11); *H04N 19/70* (2014.11); *H04N 19/82* (2014.11)

(58) Field of Classification Search
CPC ............................ H04N 19/117; H04N 19/82
(Continued)

(56) References Cited

U.S. PATENT DOCUMENTS

2015/0264374 A1    9/2015 Xiu et al.

FOREIGN PATENT DOCUMENTS

| EP | 2769548 | 8/2014 |
| EP | 3941065 | 1/2022 |

(Continued)

OTHER PUBLICATIONS

Brass et al., "Versatile Video Coding (Draft 3)," JVET-L1001-v9, Presented at Joint Video Experts Team (JVET) of ITU-T SG 16 WP 3 and ISO/IEC JTC 1/SC 29/WG 11, 12th Meeting: Macao, CN, Oct. 3-12, 2018, 235 pages.

(Continued)

*Primary Examiner* — Amir Shahnami
(74) *Attorney, Agent, or Firm* — Fish & Richardson P.C.

(57) ABSTRACT

An image encoding/decoding method and apparatus are provided. An image decoding method performed by an image decoding apparatus may include determining a chroma array type of a current image, determining an adaptive loop filter (ALF) indicator of a chroma component based on the chroma array type, and performing ALF filtering with respect to a reconstructed image based on a value of the ALF indicator. The value of the ALF indicator may be determined to be a predetermined value without being obtained from a bitstream, based on the chroma array type being a predetermined type, and the value of the ALF (Continued)

indicator may be obtained from the bitstream, based on the chroma array type being not the predetermined type.

15 Claims, 12 Drawing Sheets

(51) Int. Cl.
  *H04N 19/186* (2014.01)
  *H04N 19/423* (2014.01)
  *H04N 19/70* (2014.01)
(58) Field of Classification Search
  USPC .................................................. 375/240.12
  See application file for complete search history.

(56) References Cited

FOREIGN PATENT DOCUMENTS

| KR | 20140079498 | 6/2014 |
| KR | 20170010903 | 2/2017 |
| KR | 20170117062 | 10/2017 |
| WO | WO2013059461 | 4/2013 |
| WO | WO2021211887 | 10/2021 |

OTHER PUBLICATIONS

Brass et al., "Versatile Video Coding (Draft 4)," JVET-M1001-v7, Presented at Joint Video Experts Team (JVET) of ITU-T SG 16 WP 3 and ISO/IEC JTC 1/SC 29/WG 11, 13th Meeting: Marrakech, MA, 9 Jan. 18, 2019, 299 pages.

Li et al., "Various chroma format support in VVC," JVET-N0225-v2, Presented at Joint Video Experts Team (JVET) of ITU-T SG 16 WP 3 and ISO/IEC JTC 1/SC 29/WG 11, 14th Meeting: Geneva, CH, 19 Mar. 27, 2019, 4 pages.

Notice of Allowance in Korean Appln. No. 10-2021-7037294, dated Mar. 28, 2022, 14 pages (with English translation).

Office Action in German Appln. No. 112020002032.0, dated Jan. 20, 2022, 10 pages (with English translation).

Office Action in Indian Appln. No. 202117056832, dated Jun. 8, 2022, 6 pages.

× : Location of luma sample
○ : Location of chroma sample

× : Location of luma sample
○ : Location of chroma sample

× : Location of luma sample
○ : Location of chroma sample

FIG. 8

| seq_parameter_set_rbsp( ) { | Descriptor |
|---|---|
|   sps_decoding_parameter_set_id | u(4) |
|   sps_video_parameter_set_id | u(4) |
|   sps_max_sublayers_minus1 | u(3) |
|   sps_reserved_zero_5bits | u(5) |
|   profile_tier_level(sps_max_sub_layers_minus1 ) | |
|   gra_enabled_flag | u(1) |
|   sps_seq_parameter_set_id | ue(v) |
|   chroma_format_idc | ue(v) |
|   if(chroma_format_idc == 3 ) | |
|     separate_colour_plane_flag | u(1) |
|   ... | ... |

FIG. 9

| chroma_format_idc | separate_colour_plane_flag | ChromaArrayType | Chroma format | SubWidthC | SubHeightC |
|---|---|---|---|---|---|
| 0 | 0 | 0 | Monochrome | 1 | 1 |
| 1 | 0 | 1 | 4:2:0 | 2 | 2 |
| 2 | 0 | 2 | 4:2:2 | 2 | 1 |
| 3 | 0 | 3 | 4:4:4 | 1 | 1 |
| 3 | 1 | 0 | 4:4:4 | 1 | 1 |

FIG. 10

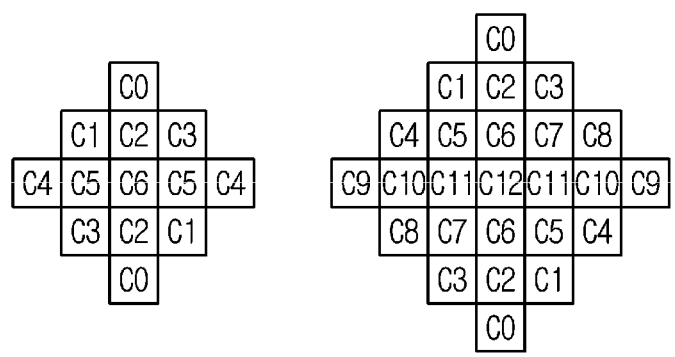

FIG. 11

| slice_header( ) { | Descriptor |
|---|---|
| ... | |
|   if( sps_alf_enabled_flag ) { | |
|     slice_alf_enabled_flag | u(1) |
|     if( slice_alf_enabled_flag ) { | |
|       num_alf_aps_ids | |
|       for( i = 0; i < num_alf_aps_ids; i++ ) | |
|         slice_alf_aps_id_luma[ i ] | u(5) |
|       if( ChromaArrayType != 0 ) | |
|         slice_alf_chroma_idc | tu(v) |
|       if( slice_alf_chroma_idc && ( slice_type != I || num_alf_aps_ids != 1 ) ) | |
|         slice_alf_aps_id_chroma | u(5) |
|     } | |
|   } | |
| ... | |
| } | |

FIG. 12

| picture_header_structure( ) { | Descriptor |
|---|---|
| ... | ... |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
| ... | ... |

FIG. 13

| picture_header_structure( ) { | Descriptor |
|---|---|
| ... | ... |
|   if( sps_alf_enabled_flag && pps_alf_info_in_ph_flag ) { | |
|     ph_alf_enabled_flag | u(1) |
|     if( ph_alf_enabled_flag ) { | |
|       ... | ... |
|       if( ChromaArrayType != 0 ) { | |
|         ph_alf_cb_flag | u(1) |
|         ph_alf_cr_flag | u(1) |
|       } | |
|     ... | ... |

FIG. 14

| slice_header( ) { | Descriptor |
|---|---|
| ... | ... |
| if( sps_alf_enabled_flag && !pps_alf_info_in_ph_flag ) { | |
| sh_alf_enabled_flag | u(1) |
| if( sh_alf_enabled_flag ) { | |
| ... | ... |
| if( ChromaArrayType != 0 ) { | |
| sh_alf_cb_flag | u(1) |
| sh_alf_cr_flag | u(1) |
| ... | ... |

FIG. 15

| alf_data( adaptation_parameter_set_id ) { | Descriptor |
|---|---|
| ... | |
| alf_luma_filter_signal_flag | u(1) |
| alf_chroma_filter_signal_flag | u(1) |
| if( alf_luma_filter_signal_flag ) { | |
| ... | |
| } | |
| ... | |
| if( alf_chroma_filter_signal_flag ) { | |
| alf_chroma_clip_flag | u(1) |
| alf_chroma_min_eg_order_minus1 | ue(v) |
| for( i = 0; i < 2; i++ ) | |
| alf_chroma_eg_order_increase_flag[ i ] | u(1) |
| for( j = 0; j < 6; j++ ) { | |
| alf_chroma_coeff_abs[ j ] | uek(v) |
| if( alf_chroma_coeff_abs[ j ] > 0 ) | |
| alf_chroma_coeff_sign[ j ] | u(1) |
| } | |
| alf_chroma_clip_min_eg_order_minus1 | ue(v) |
| for( i = 0; i < 2; i++ ) | |
| alf_chroma_clip_eg_order_increase_flag[ i ] | u(1) |
| for( j = 0; j < 6; j++ ) { | |
| if( alf_chroma_coeff_abs[ j ] ) | |
| alf_chroma_clip_idx[ j ] | uek(v) |
| } | |
| } | |
| ... | |
| } | |

FIG. 16

| alf_data( adaptation_parameter_set_id ) { | Descriptor |
|---|---|
| ... | |
|   alf_luma_filter_signal_flag | u(1) |
|   if( ChromaArrayType != 0 ) | |
|     alf_chroma_filter_signal_flag | u(1) |
|   if( alf_luma_filter_signal_flag ) { | |
|     ... | |
|   } | |
|   ... | |
|   if( alf_chroma_filter_signal_flag ) { | |
|     alf_chroma_clip_flag | u(1) |
|     alf_chroma_min_eg_order_minus1 | ue(v) |
|     for( i = 0; i < 2; i++ ) | |
|       alf_chroma_eg_order_increase_flag[ i ] | u(1) |
|     for( j = 0; j < 6; j++ ) { | |
|       alf_chroma_coeff_abs[ j ] | uek(v) |
|       if( alf_chroma_coeff_abs[ j ] > 0 ) | |
|         alf_chroma_coeff_sign[ j ] | u(1) |
|     } | |
|     alf_chroma_clip_min_eg_order_minus1 | ue(v) |
|     for( i = 0; i < 2; i++ ) | |
|       alf_chroma_clip_eg_order_increase_flag[ i ] | u(1) |
|     for( j = 0; j < 6; j++ ) { | |
|       if( alf_chroma_coeff_abs[ j ] ) | |
|         alf_chroma_clip_idx[ j ] | uek(v) |
|     } | |
|   } | |
|   ... | |
| } | |

FIG. 17

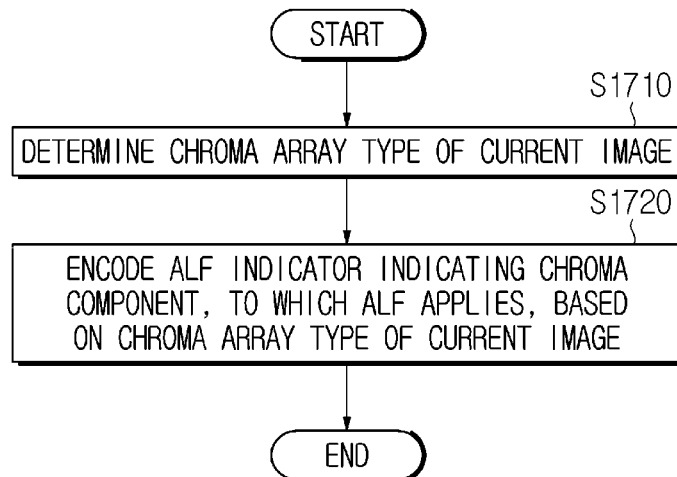

IMAGE ENCODING/DECODING METHOD AND DEVICE FOR SIGNALING FILTER INFORMATION ON BASIS OF CHROMA FORMAT, AND METHOD FOR TRANSMITTING BITSTREAM

CROSS-REFERENCE TO RELATED APPLICATIONS

This application is a National Stage application under 35 U.S.C. § 371 of International Application No. PCT/KR2020/006486, filed on May 18, 2020, which claims the benefit of U.S. Provisional Application No. 62/849,141, filed on May 16, 2019. The disclosures of the prior applications are incorporated by reference in their entirety.

TECHNICAL FIELD

The present disclosure relates to an image encoding/decoding method and apparatus, and, more particularly, to an image encoding/decoding method and apparatus signaling filter information, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus signaling filter information based on a chroma format.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include determining a chroma array type of a current image, determining an adaptive loop filter (ALF) indicator of a chroma component based on the chroma array type, and performing ALF filtering with respect to a reconstructed image based on a value of the ALF indicator.

The value of the ALF indicator may be determined to be a predetermined value without being obtained from a bitstream, based on the chroma array type being a predetermined type, and the value of the ALF indicator may be obtained from the bitstream, based on the chroma array type being not the predetermined type.

The predetermined type may be a monochrome type or a separated type in which a chroma component is encoded separately from a luma component.

The value of the ALF indicator may be determined to be a value specifying that an ALF does not apply to a chroma component, based on the chroma array type being the predetermined type.

The performing ALF filtering with respect to the reconstructed image based on the value of the ALF indicator may be performed by determining a chroma component, to which an ALF applies, according to the value of the ALF indicator.

The ALF indicator may be included and signaled in a picture header or slice header of the bitstream, based on the chroma array type being not the predetermined type.

The ALF indicator may be signaled as a first ALF indicator included and signaled in a picture header of the bitstream or a second ALF indicator included and signaled in a slice header of the bitstream, based on the chroma array type being not the predetermined type.

The first ALF indicator may be determined to be a predetermined value without being obtained from the picture header, based on the chroma array type being the predetermined type, and the second ALF indicator may be determined to be a value of the first ALF indicator without being obtained from the slice header, based on the chroma array type being the predetermined type. At this time, the second ALF indicator may be determined to be a predetermined value, by being determined to be a value of the first ALF indicator.

The image decoding method performed by the image decoding apparatus according to an aspect of the present disclosure may further include determining a value of chroma filter signaling information specifying whether to signal filter information of a chroma component based on the chroma array type.

The determining the value of the chroma filter signaling information may include obtaining, from the bitstream, a value of the chroma filter signaling information; and determining the chroma filter signaling information to be a value specifying that filter information of the chroma component is not signaled, based on the chroma array type being a predetermined type.

Meanwhile, the determining the value of the chroma filter signaling information may include obtaining, from the bitstream, a value of chroma syntax signaling information specifying whether a chroma related syntax element is included in an APS NAL unit, the value of the chroma syntax signaling information may be determined to be a value specifying that the chroma related syntax element is not included in the APS NAL unit, based on the chroma array type being a predetermined type, and the chroma filter signaling information may be determined to be a value specifying that filter information of the chroma component is not signaled without being obtained from the bitstream, based on the value of the chroma syntax signaling information being a value specifying that the chroma related syntax element is not included in an APS NAL unit.

For example, the chroma filter signaling information may be determined to be a value specifying that filter information of the chroma component is not signaled without being obtained from the bitstream, based on the chroma array type being a predetermined type.

An image decoding apparatus according to an aspect of the present disclosure may include a memory and at least one processor. The at least one processor may determine a chroma array type of a current image, determine an adaptive loop filter (ALF) indicator of a chroma component based on the chroma array type, and perform ALF filtering with respect to a reconstructed image based on a value of the ALF indicator. The value of the ALF indicator may be determined to be a predetermined value without being obtained from a bitstream, based on the chroma array type being a predetermined type, and the value of the ALF indicator may be obtained from the bitstream, based on the chroma array type being not the predetermined type.

An image encoding method performed by an image encoding apparatus according to an aspect of the present disclosure may include determining a chroma array type of a current image and generating a bitstream by encoding an adaptive loop filter (ALF) indicator specifying a chroma component to which an ALF applies, based on the chroma array type of the current image.

A value of the ALF indicator may not be encoded, based on the chroma array type being a predetermined type, and the value of the ALF indicator may be encoded, based on the chroma array type being not the predetermined type An ALF may not apply to a chroma component of the current image, based on the chroma array type being a predetermined type, and the predetermined type may be a monochrome type or a separated type in which a chroma component is encoded separately from a luma component The ALF indicator may be included and encoded in a picture header or slice header of the bitstream, based on the chroma array type being not the predetermined type.

The image encoding method performed by the image encoding apparatus according to an aspect of the present disclosure may further include determining whether to signal filter information of a chroma component based on the chroma array type.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus signaling filter information based on a chroma format.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 8 is a view illustrating an SPS syntax according to an embodiment.

FIG. 9 is a table illustrating chroma format classification according to an embodiment.

FIG. 10 is a view illustrating an ALF filter shape according to an embodiment.

FIG. 11 is a view illustrating syntax of a slice header according to an embodiment.

FIG. 12 is a view illustrating syntax of a picture header according to an embodiment.

FIG. 13 is a view illustrating syntax of a picture header according to another embodiment.

FIG. 14 is a view illustrating syntax of a slice header according to another embodiment.

FIG. 15 is a view illustrating ALF data syntax for signaling filter information according to an embodiment.

FIG. 16 is a view illustrating ALF data syntax for signaling filter information according to another embodiment.

FIGS. 17 to 18 are flowcharts illustrating an encoding method according to an embodiment.

MODE FOR INVENTION

Figure 1:
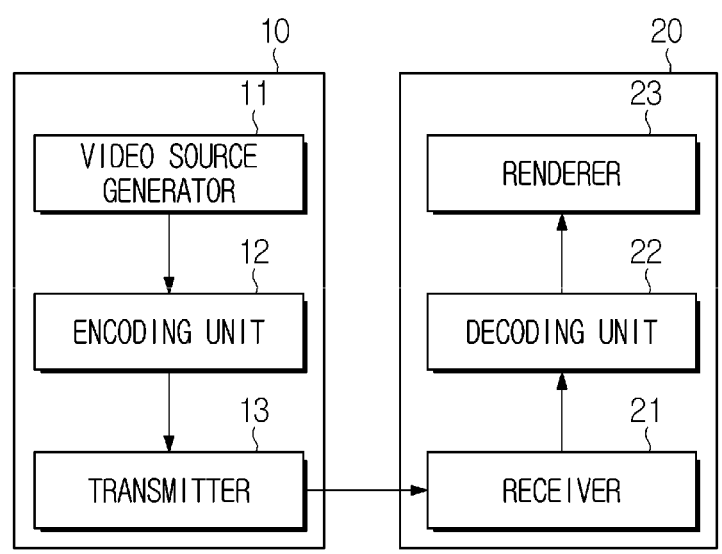
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
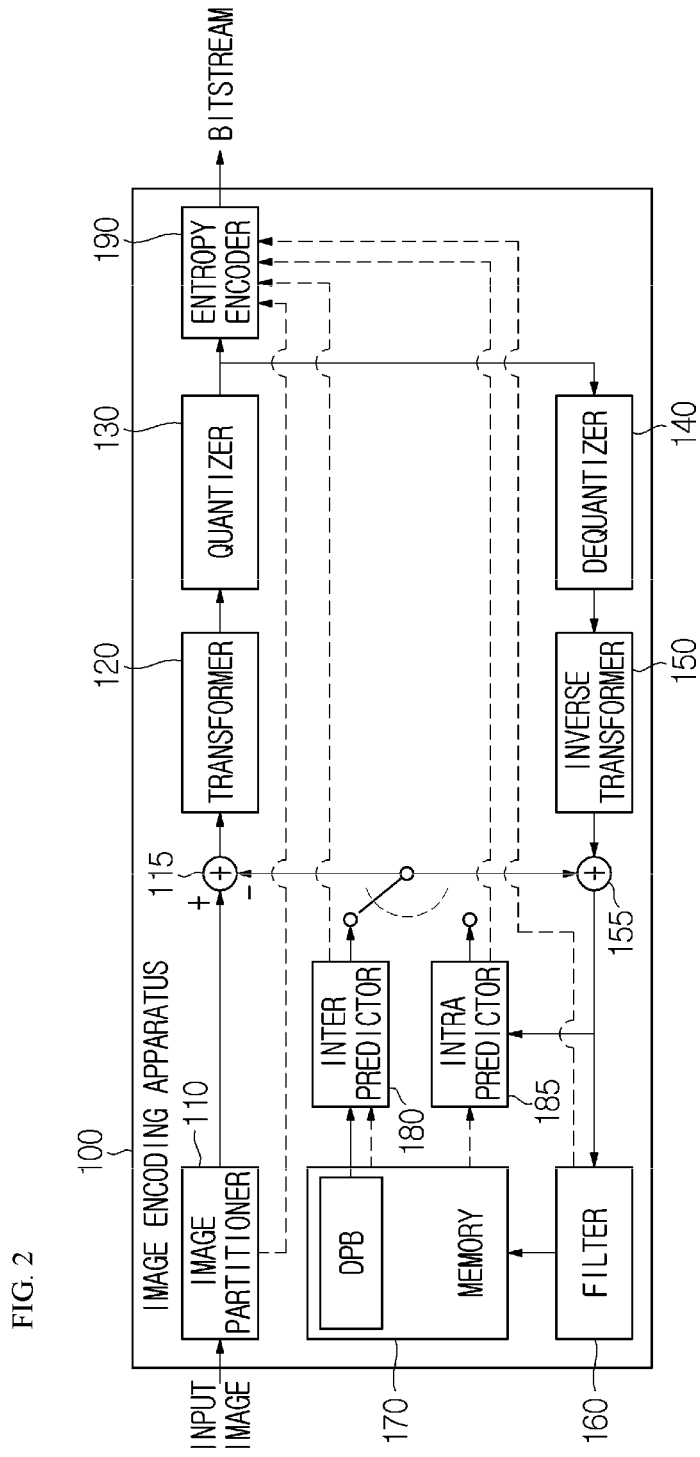
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
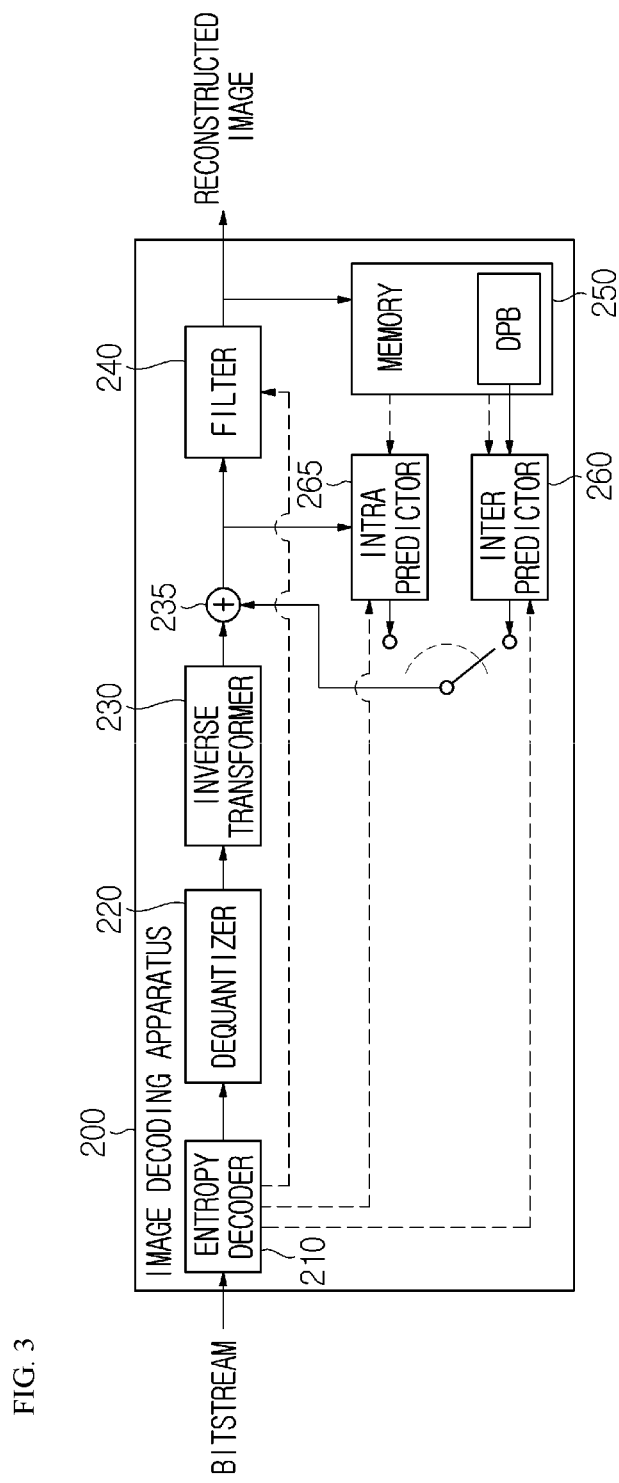
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Partitioning Structure

The image encoding/decoding method according to the present disclosure may be performed based on a partitioning structure according to an embodiment. For example, the procedures such as prediction, residual processing ((inverse) transform, (de)quantization, etc.), syntax element coding, and filtering may be performed based on a CTU, CU (and/or TU or PU) derived based on the partitioning structure. A block partitioning procedure may be performed by the image partitioner 110 of the above-described encoding apparatus and the partitioning related information may be encoded (processed) by the entropy encoder 190 and transmitted to the decoding apparatus in the form of a bitstream. The entropy decoder 210 of the decoding apparatus may derive a block partitioning structure of a current picture based on the partitioning related information obtained from the bitstream, and based on this, may perform a series of procedures (e.g., prediction, residual processing, block/picture reconstruction, in-loop filtering, etc.) for image decoding. A CU size and a TU size may be the same or a plurality of TUs may be present in a CU area. Meanwhile, the CU size may generally represent a luma component (sample) CB size. The TU size may generally represent a luma component (sample) TB size. A chroma component (sample) CB or TB size may be derived based on a luma component (sample) CB or TB size according to a component ratio according to a chroma format (color format, e.g., 4:4:4, 4:2:2, 4:2:0, etc.) of a picture/image. The TU size may be derived based on maxTbSize specifying an available maximum TB size. For example, when the CU size is greater than maxTbSize, a plurality of TUs (TBs) of maxTbSize may be derived from the CU and transform/inverse transform may be performed in units TUs (TBs). In addition, for example, when applying intra prediction, an intra prediction mode/type may be derived in units of CUs (or CBs), and a neighboring reference sample derivation and prediction sample generation procedure may be performed in units TUs (or TBs). In this case, one or a plurality of TUs (or TBs) may be present in one CU (or CB) area and, in this case, the plurality of TUs (or TBs) may share the same intra prediction mode/type.

In addition, in image encoding and decoding according to the present disclosure, an image processing unit may have a hierarchical structure. For example, one picture may be partitioned into one or more tiles or tile groups. One tile group may include one or more tiles. One tile may include one or more CTUs. The CTU may be partitioned into one or more CUs as described above. The tile may be configured in a rectangular area including CTUs aggregated in a specific row and a specific column within a picture. The tile group may include an integer number of tiles according to tile raster scan within a picture. A tile group header may signal information/parameters applicable to a corresponding tile group. When an encoding/decoding apparatus has a multi-core processor, an encoding/decoding procedure for the tile or time group may be processed in parallel. Here, the tile group may have one of tile group types including an intra (I) tile group, a predictive (P) tile group and a bi-predictive (B) tile group. For blocks in the I tile group, inter prediction may not be used and only intra prediction may be used for prediction. Of course, even in this case, an original sample value may be coded and signaled without prediction. For blocks in the P tile group, intra prediction or inter prediction may be used, and only uni-prediction may be used when inter prediction is used. Meanwhile, for blocks in the B tile group, intra prediction or inter prediction may be used and up to bi-prediction may be used when inter prediction is used.

Figure 4:
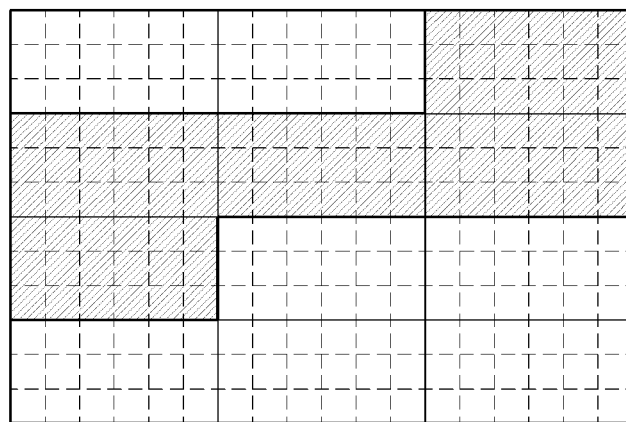
FIG. 4 is a view illustrating a slice and tile structure according to an embodiment.

In addition, one picture may be partitioned into one or more slices. A slice may be composed of an integer number of tiles or a set of CTUs continuously arranged in rows within one tile. Two modes of slices may be supported. One is a raster scan slice mode and the other is a rectangular slice mode. In the raster scan slice mode, a slice may be composed of consecutive tiles in a raster scan order present in one picture, as shown in FIG. 4. In the rectangular slice mode, a slice may be composed of tiles present in one picture in a rectangular shape. Tiles in a rectangular slice may be scanned within the slice according to the tile raster scan order.

In an encoding apparatus, a tile/tile group, a slice, and a maximum and minimum coding unit size may be determined according to the characteristics (e.g., resolution) of an image and in consideration of coding efficiency or parallel processing and information thereon or information capable of deriving the same may be included in a bitstream.

In a decoder, information specifying a slice of a current picture, a tile/tile group or a CTU in a tile is partitioned into a plurality of coding units may be obtained. When such information is obtained (transmitted) only under specific conditions, efficiency may increase.

The slice header or the tile group header (tile group header syntax) may include information/parameters commonly applicable to the slice or tile group. APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to the entire video. In the present disclosure, higher level syntax may include at least one of the APS syntax, the PPS syntax, the SPS syntax or the VPS syntax.

In addition, for example, information on partitioning and construction of the tile/tile group may be constructed at an encoding stage through the higher level syntax and transmitted to a decoding apparatus in the form of a bitstream.

In addition, in image encoding/decoding according to the present disclosure, a coding tree scheme may support luma and chroma component blocks to have a separate block tree structure. A case where luma and chroma blocks in one CTU have the same block tree structure may be represented as SINGLE_TREE. A case where luma and chroma blocks in one CTU have separate block tree structures may be represented as DUAL_TREE. In this case, a block tree type for a luma component may be referred to as DUAL_TREE_LUMA, and a block tree type for a chroma component may be referred to as DUAL_TREE_CHROMA. For P and B slice/tile groups, luma and chroma CTBs in one CTU may be limited to have the same coding tree structure. However, for I slice/tile groups, luma and chroma blocks may have separate block tree structures. When applying separate block tree modes, a luma CTB may be partitioned into CUs based on a specific coding tree structure and a chroma CTB may be partitioned into chroma CUs based on another coding tree structure. For example, a CU in I slice/tile group may be composed of a coding block of a luma component or coding blocks of two chroma components, and a CU of a P or B slice/tile group may be composed of blocks of three color components. Hereinafter, in the present disclosure, a slice may be referred to as a tile/tile group and a tile/tile group may be referred to as a slice.

Overview of Chroma Format

Hereinafter, a chroma format will be described. An image may be encoded into encoding data including a luma component (e.g., Y) array and two chroma component (e.g., Cb and Cr) arrays. For example, one pixel of an encoded image may include a luma sample and a chroma sample. A chroma format may be used to represent the configuration format of a luma sample and a chroma sample, and the chroma format may be referred to as a color format.

In an embodiment, an image may be encoded in various chroma formats such as monochrome, 4:2:0, 4:2:2 or 4:4:4. In monochrome sampling, there may be one sample array, and the sample array may be a luma array. In 4:2:0 sampling, there may be one luma sample array and two chroma sample arrays, and each of the two chroma arrays may have a height of half that of the luma array and have a width of half that of the luma array. In 4:2:2 sampling, there may be one luma sample array and two chroma sample arrays, and each of the two chroma arrays may have the same height as the luma array and have a width of half that of the luma array. In 4:4:4 samples, there may be one luma sample array and two chroma sample arrays, and each of the two chroma arrays may have the same height and width as the luma array.

Figure 5:
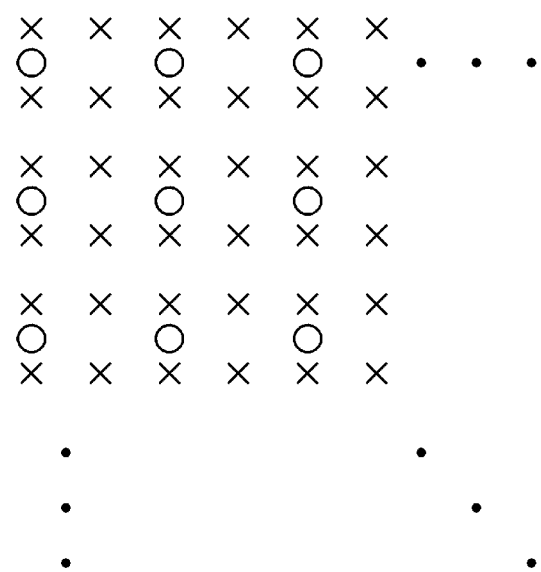
FIGS. 5 to 7 are views illustrating a location relationship between a luma sample and a chroma sample determined according to a chroma format according to an embodiment.
Figure 6:
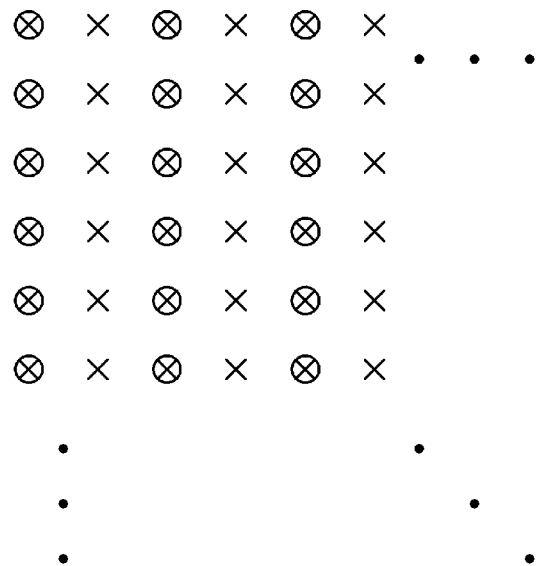
Figure 7:
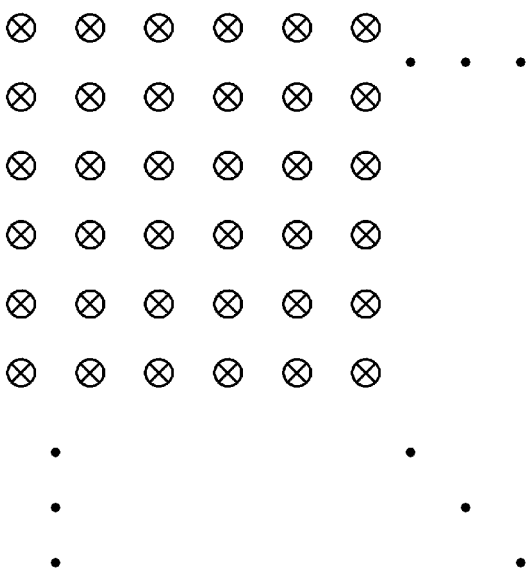

FIG. 5 is a view illustrating a relative position according to an embodiment of a luma sample and a chroma sample according to 4:2:0 sampling. FIG. 6 is a view illustrating a relative location according to an embodiment of a luma sample and a chroma sample according to 4:2:2 sampling. FIG. 7 is a view illustrating a relative location according to an embodiment of a luma sample and a chroma sample according to 4:4:4 sampling. As shown in FIG. 5, in case of 4:2:0 sample, chroma samples may be located below corresponding luma samples. As shown in FIG. 6, in case of 4:2:2 sampling, chroma samples may be located to overlap luma samples. As shown in FIG. 7, in case of 4:4:4 sampling, all luma samples and chroma samples may be located to overlap each other.

A chroma format used in the encoding apparatus and the decoding apparatus may be predetermined. Alternatively, a chroma format may be signaled from the encoding apparatus to the decoding apparatus to be adaptively used in the encoding apparatus and the decoding apparatus. In one embodiment, the chroma format may be signaled based on at least one of chroma_format_idc or separate_colour_plane_flag. At least one of chroma_format_idc or separate_colour_plane_flag may be signaled through higher level syntax such as DPS, VPS, SPS or PPS. For example, chroma_format_idc and separate_colour_plane_flag may be included in the SPS syntax shown in FIG. 8.

Meanwhile, FIG. 9 shows an embodiment of chroma format classification using signaling of chroma_format_idc and separate_colour_plane_flag. chroma_format_idc may be information specifying a chroma format applying to an encoding image. separate_colour_plane_flag may specify whether a color array is separately processed in a specific chroma format. For example, a first value (e.g., 0) of chroma_format_idc may represent monochrome sampling. A second value (e.g., 1) of chroma_format_idc may represent 4:2:0 sampling. A third value (e.g., 2) of chroma_format_idc may represent 4:2:2 sampling. A fourth value (e.g., 3) of chroma_format_idc may represent 4:4:4 sampling.

In 4:4:4 sampling, the following is applicable based on a value of separate_colour_plane_flag. If separate_colour_plane_flag has a first value (e.g., 0), each of two chroma arrays may have the same height and width as a luma array. In this case, a value of ChromaArrayType specifying the type of a chroma sample array may be set equally to chroma_format_idc. If separate_colour_plane_flag has a second value (e.g., 1), luma, Cb and Cr sample arrays may be processed separately to be processed like monochrome-sampled pictures. At this time, ChromaArrayType may be set to 0.

Based on the chroma format classification of FIG. 9, the following various embodiments may be provided.

Overview of ALF (Adaptive Loop Filter)

An ALF (Adaptive loop filter) is one of an in-loop filtering technique used to improve the quality of a reconstructed image after encoding/decoding is finished. In an embodiment, ALF is applicable after applying SAO (Sample Adaptive Offset) filtering to the reconstructed image. According to application of ALF, compression loss may be compensated. ALF is a filtering method based on a Wiener Filter, and has excellent encoding efficiency by minimizing a difference from an original image, but has high encoding complexity.

The ALF may perform filtering by deriving an optimal filter coefficient which minimizes a difference between an original image and a reconstructed image as shown in the following equation. An encoding apparatus may encode a derived filter coefficient and signal the encoded filter coefficient to a decoding apparatus.

$$c_i = \mathrm{argmin} E\left[\left(x - \sum_{i=0}^{N-i} y_i c_i\right)^2\right] \quad \text{[Equation 1]}$$

where, x may denote a pixel value of an original image, $c_i$ may denote an i-th filter coefficient, N may denote the number of filter coefficients, and y may denote a pixel value of a reconstructed image.

FIG. 10 shows an embodiment of a shape of a filter for performing ALF. A 5×5 filter shown at the left side of FIG. 10 has a diamond shape and may be used to apply ALF to a chroma component. A 7×7 filter shown at the right side of FIG. 10 has a diamond shape and may be used to apply ALF to a luma component. A block configuring each filter may have a 4×4 block unit.

In an embodiment, 32 different ALF filter sets for applying ALF may be signaled from an encoding apparatus to a decoding apparatus as an adaptive parameter set (APS). The encoding apparatus may classify classes by identifying the characteristics of a block in units of 4×4 blocks configuring the ALF and generate ALF parameters by calculating filter coefficients.

More specifically, the encoding apparatus may calculate a filter coefficient for each of 4×4 blocks based on a direction and activity of a pixel in a block using a local gradient of the 4×4 block unit. The direction may be classified by calculating horizontal, vertical and diagonal gradients using 1D-Laplacian from neighbouring pixels including a 4×4 block. Activity may be classified by performing 2D-Laplacian operation based on a gradient calculated for direction classification. Accordingly, each 4×4 block may be determined to be one of ALF filter sets based on the determined direction and activity.

Overview of ALF Parameter Signaling

As described above, 32 different ALF filter sets for applying ALF may be signaled using APS from an encoding apparatus to a decoding apparatus. A predetermined coding unit such as a tile group or a slice group may reuse ALF information signaled previously through the APS in order to reduce overhead.

In an embodiment, whether to signal ALF information may be determined according to a chroma sample array type of a predetermined coding unit. Here, the predetermined coding unit may be at least one of a picture, a tile group or a slice.

For example, the encoding apparatus may skip signaling of ALF information for a chroma component when a chroma component is not included in a current coding unit or when a value of ChromaArrayType is set to a first value (e.g., 0). In this case, the decoding apparatus may reuse ALF information signaled previously without obtaining ALF information from a bitstream. For example, the decoding apparatus may skip application of the ALF for a chroma component or apply the ALF for the chroma component using ALF information for a luma component. Accordingly, when a chroma component is not included in the current coding unit or when ALF information of a luma component may be reused for application of the ALF for the chroma component, signaling of ALF information between the encoding apparatus and the decoding apparatus may be skipped.

ALF Information Signaling in Slice Units

In the following description, an example of signaling ALF information through a slice header will be described. However, the following description of the slice header is applicable to a tile group header or a picture header. For example, in the following description, the slice header may be replaced with a tile group header. Alternatively, the slice header may be replaced with a picture header.

For example, as shown in FIG. 11, whether to signal ALF information in a slice header may be determined according to a value of ChromaArrayType. FIG. 11 is a table showing an embodiment of syntax for determining whether to signal slice_alf_chroma_idc in a slice header according to a chroma array type of a current slice.

Hereinafter, this will be described in greater detail with respect to FIG. 11. In FIG. 11, sps_alf_enabled_flag may be flag information specifying whether to apply the ALF. For example, a first value (e.g., 0) of sps_alf_enabled_flag may specify that the ALF is not enabled. A second value (e.g., 1) of sps_alf_enabled_flag may specify that the ALF is enabled.

sps_alf_enabled_flag may be transmitted at a sequence parameter set (SPS) level, and may be set to a basic value specifying whether to apply the ALF for an image sequence to which a corresponding sequence parameter set applies.

slice_alf_enabled_flag may be flag information specifying whether to apply the ALF to luma (Y) and chroma (Cb and Cr) components present in one slice. A first value (e.g., 0) of slice_alf_enabled_flag may specify that the ALF for all components in a single slice are not enabled. A second value (e.g., 1) of slice_alf_enabled_flag may specify that the ALF for at least one component of Y, Cb or Cr in a single slice is enabled. When slice_alf_enabled_flag is not present, a value of slice_alf_enabled_flag may be derived to be a first value (e.g., 0).

num_alf_aps_ids may be information specifying the number of the ALF APS referenced by the slice. In an embodiment, the value of num_alf_aps_ids may represent any one of 0 to 6. In another embodiment, the value of num_alf_aps_ids may represent any one of 0 to 5. When num_alf_aps_ids is not present, the value of num_alf_aps_ids may be derived to be 0.

slice_alf_aps_id_luma[i] may be information specifying adaptation_parameter_set_id of an i-th ALF APS referenced by the slice. adaptation_parameter_set_id may be identification information for identifying the APS.

The value of a temporal identifier TemporalId of an ALF APS NAL unit having the same adaptation_parameter_set_id as the value of slice_alf_aps_id_luma[i] may be less than or equal to the size of the TemporalId value of the encoded slice NAL unit. When a plurality of ALF APS having the same value as adaptation_parameter_set_id is referenced from two or more slices present in the same picture, the plurality of ALF APS having the same value as adaptation_parameter_set_id may have the same content.

For a slice and an intra slice in an IRAP (Intra Random Access Point) picture, slice_alf_aps_id_luma[i] may reference an ALF APS associated with pictures including intra slices or an TRAP picture, and referencing an ALF APS associated with pictures other than pictures including the intra slices or the TRAP picture may be prohibited.

slice_alf_chroma_idc may be ALF index information specifying whether an ALF applies for Cb and Cr components which are chroma components. A first value (e.g., 0) of slice_alf_chroma_idc may specify that the ALF does not apply for the Cb and Cr components. A second value (e.g., 1) of slice_alf_chroma_idc may specify that the ALF applies for the Cb component. A third value (e.g., 2) of slice_alf_chroma_idc may specify that the ALF applies for the Cr component. A fourth value (e.g., 3) of slice_alf_chroma_idc may specify that the ALF applies for both the Cb and Cr components. When the value of slice_alf_chroma_idc is not present, the value of slice_alf_chroma_idc may be derived to be a first value (e.g., 0).

slice_alf_aps_id_chroma may be information specifying adaptation_parameter_set_id referenced by the chroma component of the slice. When the value of slice_alf_aps_id_chroma is not present, the value of slice_alf_aps_id_chroma may be derived to the same value as slice_alf_aps_id_luma[0]. TemporalId of the ALF APS NAL unit having adaptation_parameter_set_id having the same value as slice_alf_aps_id_chroma may be a value less than or equal to TemporalId of the encoded slice NAL unit.

For a slice and an intra slice in an IRAP picture, slice_alf_aps_id_chroma may reference an ALF APS associated with pictures including intra slices or an IRAP picture, and referencing an ALF APS associated with pictures other than pictures including the intra slices and the IRAP picture may be prohibited.

chromaArrayType may be information specifying whether a chroma component is present in a current coding unit. For example, a first value (e.g., 0) of chromaArrayType may specify that a chroma component is not present in the current coding unit. In this case, a decoding apparatus may not parse the value of slice_alf_chroma_idc from a bitstream. Accordingly, the decoding apparatus may also not parse ALF information (e.g., slice_alf_aps_id_chroma) related to the chroma to reduce overhead.

A second value (e.g., 1) of chromaArrayType may specify that a chroma component is present in the current coding unit. In this case, the decoding apparatus may parse the value of slice_alf_chroma_idc from the bitstream, and, accordingly, the decoding apparatus may also parse ALF information (e.g., slice_alf_aps_id_chroma) related to the chroma.

ALF Information Signaling in Picture Unit

Meanwhile, as described above, a determination of whether to signal ALF information according to the value of the above-described ChromaArrayType may also apply for ALF information signaling in a picture header.

For example, as shown in FIG. 12, whether to signal ALF information in a picture header may be determined according to the value of ChromaArrayType. FIG. 12 is a table illustrating an embodiment of syntax for determining whether to signal ph_alf_chroma_idc in a picture header according to a chroma array type of a current picture. Hereinafter, this will be described with reference to FIG. 12.

A method of determining whether to signal ALF information including ph_alf_chroma_idc according to the value of ChromaArrayType may apply in the same manner as signaling in the above-described slice header. For example, ph_alf_chroma_idc may be information specifying whether to apply the ALF for the Cb and Cr components which are the chroma components. A first value (e.g., 0) of ph_alf_chroma_idc may specify that the ALF does not apply for the Cb and Cr components. A second value (e.g., 1) of ph_alf_chroma_idc may specify that the ALF applies for the Cb component. A third value (e.g., 2) of ph_alf_chroma_idc may specify that the ALF applies for the Cr component. A fourth value (e.g., 3) of ph_alf_chroma_idc may specify that the ALF applies for both the Cb and Cr components. When the value of slice_alf_chroma_idc is not present, the value of ph_alf_chroma_idc may be derived to be a first value (e.g., 0).

When ph_alf_chroma_idc is utilized, since ph_alf_chroma_idc specifies whether to apply the ALF at a higher level than the above-described slice_alf_chroma_idc, when the value of slice_alf_chroma_idc is not present, slice_alf_chroma_idc may be derived to be the value of ph_alf_chroma_idc.

Selective Use of Picture Unit or Slice Unit

Meanwhile, in another embodiment, ALF information may be included in any one of a picture header or a slice header. In this case, information (e.g., pps_alf_info_in_ph_flag) specifying which of the picture header or the slice header includes the ALF information may be further included in a bitstream. For example, since pps_alf_info_in_ph_flag is included and signaled in a picture parameter set which is a collection of parameters commonly applied to a picture unit, ALF information being included in any one header selected from a picture header or a slice header (e.g., to which a corresponding parameter set applies) corresponding to a picture parameter set including pps_alf_info_in_ph_flag may be signaled.

In an embodiment, a first value (e.g., 0) of pps_alf_info_in_ph_flag may specify that ALF information is not included in a picture header. In this case, ALF information (e.g., slice_alf_chroma_idc) may be included in a slice header. A second value (e.g., 1) of pps_alf_info_in_ph_flag may specify that ALF information (e.g., ph_alf_chroma_idc) is included in a picture header. In this case, the ALF information may not be included in a slice header.

FIG. 13 illustrates syntax for obtaining ALF information from a picture header when the value of pps_alf_info_in_ph_flag is 1. According to the syntax of FIG. 13, an encoding apparatus may encode ALF information in a picture header, and a decoding apparatus may obtain ALF information from a picture header. For example, when the value of pps_alf_info_in_ph_flag is 1, information (e.g., ph_alf_enabled_flag) specifying whether an ALF is applicable to a current picture may be obtained. When the value of ph_alf_enabled_flag is a value (e.g., 1) specifying that the ALF is used, information specifying whether the ALF applies for a chroma component may be obtained from a picture header according to a chroma array type. At this time, information specifying whether the ALF applies for the chroma component may be signaled. In an embodiment, information (e.g., ph_alf_chroma_idc or ph_alf_cb_flag, ph_alf_cr_flag) specifying whether the ALF applies for each of the Cb component and the Cr component may be signaled. This may be used similarly to the above-described ph_alf_chroma_idc, but, by using a separate flag for each of the Cr color component and the Cb color component, whether to apply the ALF may be signaled. In an embodiment, a first value (e.g., 0) of ph_alf_cb_flag may specify that the ALF does not apply to the Cb color component. A second value (e.g., 1) of ph_alf_cb_flag may specify that the ALF applies to the Cb color component. A first value (e.g., 0) of ph_alf_cr_flag may specify that the ALF does not apply to the Cr color component. A second value (e.g., 1) of ph_alf_cr_flag may specify that the ALF applies to the Cr color component.

FIG. 14 illustrates syntax for obtaining ALF information (e.g., sh_alf_enabled_flag, sh_alf_cb_flag, sh_alf_cb_flag) in a slice header when the value of pps_alf_info_in_ph_flag is 0. As described in the picture header with reference to FIG. 13, according to the syntax of FIG. 14, an encoding apparatus may encode ALF information in a slice header, and a decoding apparatus may obtain ALF information from a slice header.

ALF Information Signaling

In an embodiment, as shown in FIG. 15, ALF information may be signaled from an encoding apparatus to a decoding apparatus. Hereinafter, this will be described with reference to FIG. 15. alf_luma_filter_signal_flag may be flag information specifying whether a luma filter set is signaled. For example, a first value (e.g., 0) of alf_luma_filter_signal_flag may specify that the luma filter set is not signaled. A second value (e.g., 1) of alf_luma_filter_signal_flag may specify that the luma filter set is signaled.

alf_chroma_filter_signal_flag may be flag information specifying whether a chroma filter is signaled. A first value (e.g., 0) of alf_chroma_filter_signal_flag may specify that the chroma filter is not signaled. A second value (e.g., 1) of alf_chroma_filter_signal_flag may specify that the chroma filter is signaled. When the value of alf_chroma_filter_signal_flag is not present, the value of alf_chroma_filter_signal_flag may be derived to be a first value (e.g., 0).

In the above embodiment, the value of alf_chroma_filter_signal_flag may be determined according to the value of ChromaArrayType. In an embodiment, when a chroma component is not present in a target coding unit, an encoding apparatus does not need to signal chroma filter information to a decoding apparatus. Accordingly, when a chroma component is not present in a target coding unit, the value of alf_chroma_filter_signal_flag may be forced to be 0. Accordingly, an encoding apparatus and a decoding apparatus according to an embodiment may not perform signaling of chroma filter information and force the value of alf_chroma_filter_signal_flag to be 0, when the value of ChromaArrayType is 0.

In addition, in order to reduce the frequency of signaling of alf_chroma_filter_signal_flag itself between the encoding apparatus and the decoding apparatus, chromaArrayType which is information specifying whether a chroma component is present in a current coding unit may be used. FIG. 16 is a table illustrating an embodiment of syntax for determining whether to signal alf_chroma_filter_signal_flag according to the value of ChromaArrayType. Hereinafter, this will be described with reference to FIG. 16.

In an embodiment, a first value (e.g., 0) of chromaArrayType may specify that a chroma component is not present in a current coding unit. In this case, an encoding apparatus may not encode the value of alf_chroma_filter_signal_flag. In response thereto, the decoding apparatus may not parse the value of alf_chroma_filter_signal_flag from a bitstream. Accordingly, the decoding apparatus may not parse alf_chroma_clip_flag and alf_chroma_coeff_abs[ ] which are ALF information related to the chroma in order to reduce overhead. Here, alf_chroma_clip_flag may be flag information specifying whether a linear ALF applies to a chroma component. alf_chroma_coeff_abs[ ] may be information specifying the coefficient of a chroma filter which is alternatively applicable.

A second value (e.g., 1) of chromaArrayType may specify that a chroma component is present in a current coding unit. In this case, a decoding apparatus may parse the value of alf_chroma_filter_signal_flag from a bitstream. In addition, the decoding apparatus may parse alf_chroma_clip_flag and alf_chroma_coeff_abs[ ] which are ALF information related to the chroma according to the value of the parsed alf_chroma_filter_signal_flag.

In addition, in an embodiment, in order to reduce the frequency of signaling of alf_chroma_filter_signal_flag itself between the encoding apparatus and the decoding apparatus, information (e.g., aps_chroma_present_flag) specifying whether a chroma related syntax element is included in a current signaling unit (e.g., APS NAL unit) may be used.

For example, a first value (e.g., 0) of aps_chroma_present_flag obtained from the bitstream may specify that a chroma component is not present in a current APS NAL unit. Therefore, the encoding apparatus may not encode the value of alf_chroma_filter_signal_flag. In response thereto, the decoding apparatus may not parse the value of alf_chroma_filter_signal_flag from the bitstream.

A second value (e.g., 1) of aps_chroma_present_flag obtained from the bitstream may specify that a chroma component is present in a current APS NAL unit. Therefore, the encoding apparatus may encode the value of alf_chroma_filter_signal_flag, and, in response thereto, the decoding apparatus may parse the value of alf_chroma_filter_signal_flag from the bitstream.

Meanwhile, the value of aps_chroma_present_flag may be determined according to ChromaArrayType. For example, when ChromaArrayType has a first value (e.g., 0) specifying that a chroma component is not present in a current coding unit, the value of aps_chroma_present_flag may be forced to be a first value (e.g., 0) specifying that a chroma component is not present in a current APS NAL unit, regardless of whether it is obtained from the bitstream.

Encoding Method

Hereinafter, an image encoding method performed by an image encoding apparatus to which the above-described ALF signaling method applies will be described. FIG. 17 is a flowchart illustrating an image encoding method according to an embodiment.

In order to perform an image encoding method according to an embodiment, an image encoding apparatus may determine a chroma array type (e.g., ChromaArrayType) of a current image (S1710). The image encoding apparatus may determine that a chroma format for encoding the current image is a chroma format with high compression efficiency. In addition, the image encoding apparatus may determine the chroma array type according to the chroma format, as described above.

Next, the image encoding apparatus may encode an ALF indicator indicating a chroma component, to which an ALF applies, based on the chroma array type of the current image to generate a bitstream (S1720). At this time, the encoding apparatus may not encode the value of the ALF indicator, when the chroma array type is a predetermined type.

Here, the predetermined type may be a monochrome type or a separated type in which a chroma type is encoded separately from a luma component. Therefore, when the chroma array type is the predetermined type, the encoding apparatus may not apply the ALF to the chroma component of the current image and may not signal ALF information to the decoding information, thereby obtaining encoding efficiency and reducing encoding complexity.

Meanwhile, the encoding apparatus may encode the value of the ALF indicator, when the chroma array type is not the predetermined type. In this case, an ALF filtering target chroma component applied to a reconstructed image generated in the image encoding process may be determined. In addition, the encoding apparatus may determine an ALF indicator indicating the determined chroma component. In addition, the encoding apparatus may encode the determined ALF indicator by including it in at least one of a picture header or a slice header of the bitstream. Here, a first ALF indicator included in the picture header may be the above-described ph_alf_chroma_idc, and a second ALF indicator included in the slice header may be the above-described slice_alf_chroma_idc. Meanwhile, the encoding apparatus may not encode ph_alf_chroma_idc and slice_alf_chroma_idc, when the chroma array type is the predetermined type. Alternatively, the first ALF header included in the picture header may be at least one of the above-described ph_alf_cb_flag or ph_alf_cb_flag, and the second ALF indicator included in the slice header may be at least one of the above-described sh_alf_cb_flag or sh_alf_cb_flag. In this case, the encoding apparatus may not encode ph_alf_cb_flag, ph_alf_cb_flag, sh_alf_cb_flag and sh_alf_cb_flag, when the chroma array type is the predetermined type.

Furthermore, the encoding apparatus according to an embodiment may selectively encode ALF information only in any one of a picture header or a slice header. In this case, the encoding apparatus may further encode pps_alf_info_in_ph_flag as described above, in order to specify which of the picture header and the slice header includes the ALF information.

In addition, the encoding apparatus according to an embodiment may determine whether to signal filter information of a chroma component based on the chroma array type. In an embodiment, the encoding apparatus may encode chroma filter signaling information (alf_chroma_filter_signal_flag) specifying whether to signal the filter information of the chroma component into a value specifying that the filter information of the chroma component is not signaled, when the chroma array type is the predetermined type.

Figure 18:
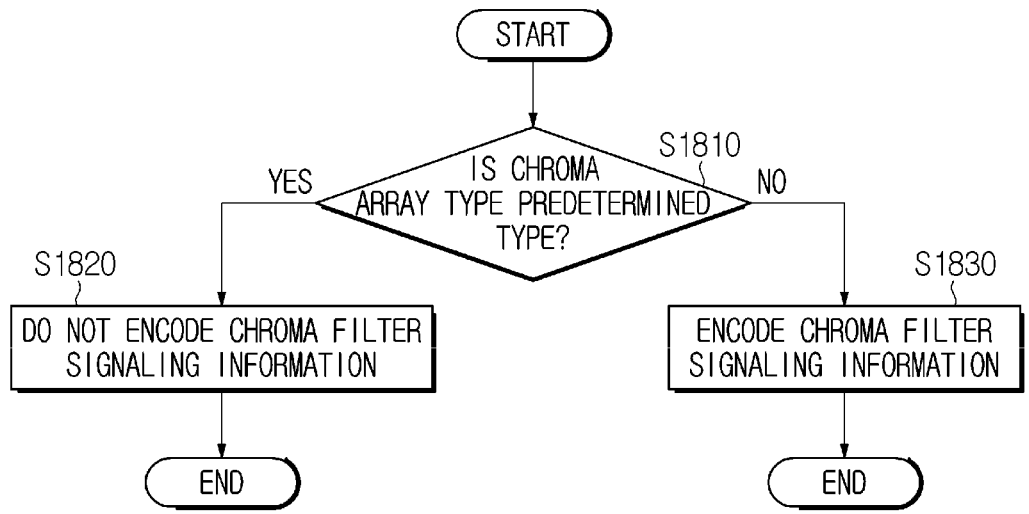

Meanwhile, in another embodiment, the encoding apparatus may determine whether to signal chroma filter signaling information according to the chroma array type as shown in FIG. 18. In an embodiment, the encoding apparatus may determine whether the chroma array type is the above-described predetermined type (S1810), and may not encode alf_chroma_filter_signal_flag (S1820) when the chroma array type is the above-described predetermined type. In this case, the decoding apparatus may determine that the value of alf_chroma_filter_signal_flag is a predetermined value, depending on that the chroma array type is the predetermined type as described above. Meanwhile, the encoding apparatus may encode alf_chroma_filter_signal_flag (S1830) when the chroma array type is not the above-described predetermined type.

The encoding apparatus according to an embodiment may encode chroma syntax signaling information (e.g., aps_chroma_present_flag) specifying whether a chroma related syntax element is included in an APS NAL unit. As described above, aps_chroma_present_flag may be determined to be a first value (e.g., 0) or a second value (e.g., 1), depending on whether the chroma related syntax element is included in the APS NAL unit.

In this embodiment, the encoding apparatus may not encode alf_chroma_filter_signal_flag, when aps_chroma_present_flag is encoded into a first value (e.g., 0) specifying that a chroma component is not present in a current APS NAL unit. Furthermore, when the chroma array type is the above-described predetermined type, the encoding apparatus may not encode alf_chroma_filter_signal_flag, as the value of alf_chroma_filter_signal_flag is forced to be a first value in the decoding apparatus.

Decoding Method

Figure 19:
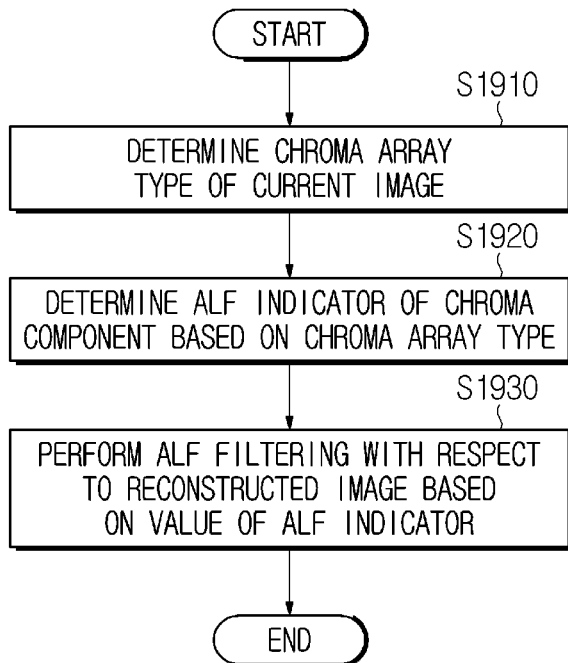
FIGS. 19 to 21 are flowcharts illustrating a decoding method according to an embodiment.

Hereinafter, an image decoding method performed by an image decoding apparatus, to which the above-described ALF signaling method applies, will be described. FIG. 19 is a flowchart illustrating an image decoding method according to an embodiment. In order to perform the image decoding method according to an embodiment, the image decoding apparatus may determine a chroma array type of a current image (S1910). The image decoding apparatus may obtain chroma_format_idc and separate_colour_plane_flag from a bitstream, determine a chroma format according to the value of the corresponding parameter, and determine the chroma array type of the current image according to the determined chroma format, as described above.

Next, the image decoding apparatus may determine an adaptive loop filter (ALF) indicator of a chroma component based on the chroma array type (S1920). In an embodiment, when the chroma array type is a predetermined type, the value of the ALF indicator may be determined to be a predetermined value without being obtained from a bitstream. In one embodiment, when the chroma array type is not the predetermined type, the value of the ALF indicator may be obtained from the bitstream.

Here, the predetermined type may be the above-described monochrome type or a separated type in which a chroma component is encoded separately from a luma component, like monochrome-sampled pictures by separately processing luma, Cb and Cr sample arrays.

In the above embodiment, when the chroma array type is the predetermined type, the decoding apparatus may determine that the value of the ALF indicator is a value specifying that the ALF does not apply to the chroma component. For example, the decoding apparatus may set the value of the ALF indicator to 0, when the chroma array type is a monochrome type or a separated type.

In an embodiment, the decoding apparatus may perform ALF filtering with respect to a reconstructed image, by determining the chroma component, to which the ALF applies, according to the determined value of the ALF indicator. The decoding apparatus may determine that the ALF does not apply for the Cb and Cr components, when the value of the ALF indicator is a first value (e.g., 0), as described above. The decoding apparatus may determine that the ALF applies for the Cb component, when the value of the ALF indicator is a second value (e.g., 1), as described above. The decoding apparatus may determine that the ALF applies for the Cr component, when the value of the ALF indicator is a third value (e.g., 2), as described above. The decoding apparatus may determine that the ALF applies for both the Cb and Cr components, when the value of the ALF indicator is a fourth value (e.g., 3), as described above.

Meanwhile, in an embodiment, when the chroma array type is not the predetermined type, the ALF indicator may be included and signaled in at least one of a picture header or slice header of the bitstream. In this case, the decoding apparatus may obtain the ALF indicator from at least one of the picture header or the slice header. For example, the decoding apparatus may obtain, from the bitstream, at least one of a first ALF indicator (e.g., ph_alf_chroma_idc) included in the picture header or a second ALF indicator (e.g., slice_alf_chroma_idc) in the slice header. In an embodiment, when the chroma array type is not the predetermined type, at least one of the first ALF indicator or the second ALF indicator may be signaled.

In an embodiment, only one of the first ALF indicator and the second ALF indicator may be signaled. In this case, as described above, pps_alf_info_in_ph_flag specifying which of the picture header and slice header of the bitstream includes ALF information may be further included, as described above. Therefore, the decoding apparatus may obtain pps_alf_info_in_ph_flag from the bitstream and then selectively obtain the first ALF indicator or the second ALF indicator from the bitstream according to the value of pps_alf_info_in_ph_flag.

Meanwhile, when the chroma array type is a predetermined type (e.g., a monochrome type or a separated type), the first ALF may be determined to be a predetermined value without being indicator obtained from a picture header. At this time, the predetermined value may be a first value (e.g., 0) specifying that the ALF does not apply for the Cb and Cr components. In addition, when the chroma array type is the predetermined type, the second ALF indicator may be determined to be a predetermined value without being obtained from a slice header. At this time, the predetermined value may be a first value (e.g., 0) specifying that the ALF does not apply for the Cb and Cr components. When the chroma array type is the predetermined type, the value of the second ALF indicator may be determined by determining the value of the first ALF indicator to be the value of the second ALF indicator.

Meanwhile, the first ALF indicator included in the picture header may be at least one of the above-described ph_alf_cb_flag or ph_alf_cb_flag, and the second ALF indicator included in the slice header may be at least one of the above-described sh_alf_cb_flag or sh_alf_cb_flag. In this case, when the chroma array type is the predetermined type, the decoding apparatus may determine ph_alf_cb_flag, ph_alf_cb_flag, sh_alf_cb_flag and sh_alf_cb_flag to be a predetermined value without being obtained from the bitstream. At this time, the predetermined value may be a first value (e.g., 0) specifying that the ALF does not apply.

Next, the image decoding apparatus may perform ALF filtering with respect to the reconstructed image based on the value of the ALF indicator (S1930). In an embodiment, the decoding apparatus may apply ALF filtering for a corresponding slice according to the value of the first ALF indicator or the second ALF indicator.

Meanwhile, in an embodiment, the decoding apparatus may determine the value of chroma filter signaling information (e.g., alf_chroma_filter_signal_flag) specifying whether to signal filter information of a chroma component based on the chroma array type. The decoding apparatus may obtain ALF filter information of the chroma component from the bitstream based on the chroma filter signaling information.

Figure 20:
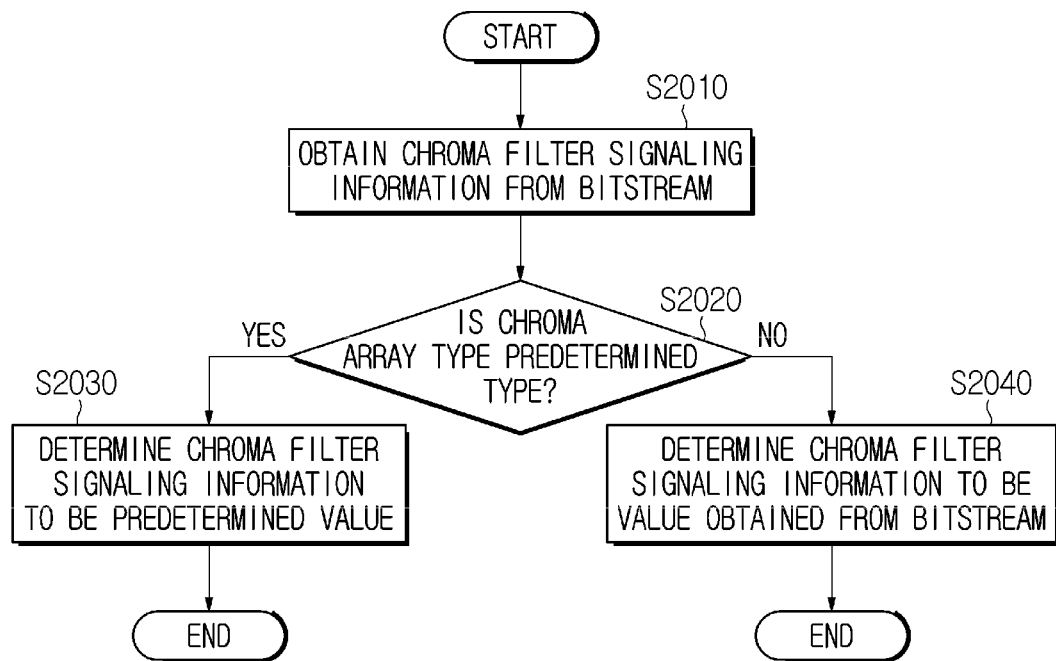

FIG. 20 is a view illustrating an embodiment in which a decoding apparatus according to an embodiment determines a value of alf_chroma_filter_signal_flag. The decoding apparatus may obtain, from a bitstream, a value of chroma filter signaling information (S2010). Next, the decoding apparatus determines whether the chroma array type is a predetermined type (S2020). When the chroma array type is a predetermined type (e.g., a monochrome type or a separated type), the decoding apparatus may determine a value of the chroma filter signaling information (S2030), by determining that the chroma filter signaling information to be a value (e.g., 0) specifying that the filtering information of the chroma component is not signaled. Meanwhile, when the chroma array type is not the predetermined type, the decoding apparatus may determine the value of the chroma filter signaling information (S2040), by determining the chroma filter signaling information to be a value obtained from the bitstream.

Figure 21:
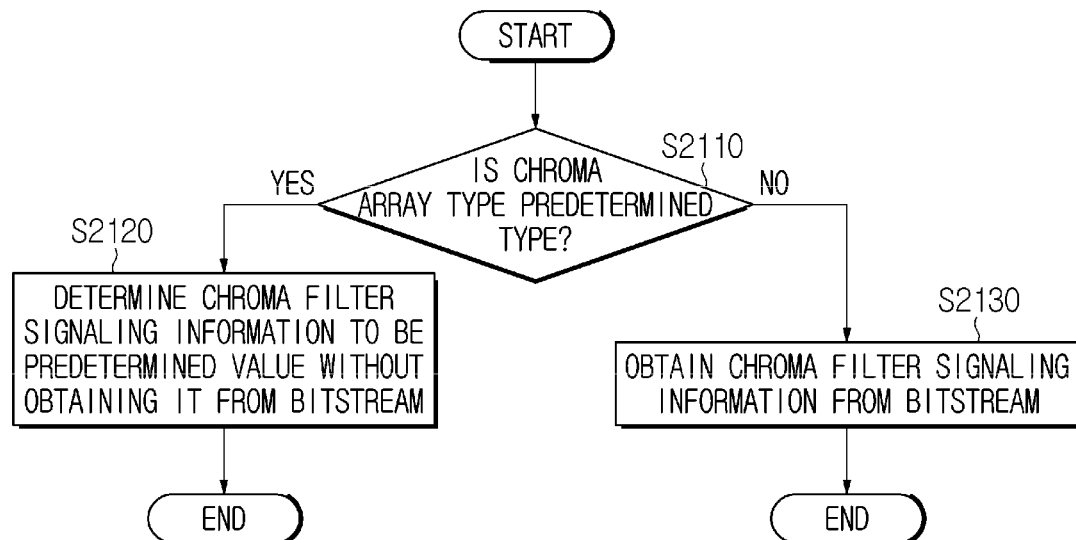

Alternatively, in an embodiment, as shown in FIG. 21, the decoding apparatus may determine whether the chroma array type is a predetermined type (S2110), and determine chroma filter signaling information to be a value (e.g., 0) specifying that filter information of the chroma component is not signaled without obtaining it from the bitstream (S2120), when the chroma array type is the predetermined type. Meanwhile, when the chroma array type is not the predetermined type, the decoding apparatus may obtain the chroma filter signaling information from the bitstream and determine the value of the chroma filter signaling information by determining it to be the obtained value (S2130).

Alternatively, in an embodiment, the decoding apparatus may obtain, from the bitstream, the value of the chroma syntax signaling information (e.g., aps_chroma_present_flag) specifying whether the chroma related syntax element is included in an APS NAL unit. When the value of aps_chroma_present_flag is a value specifying that the chroma related syntax element is included in the APS NAL unit, the decoding apparatus may determine the value of alf_chroma_filter_signal_flag, by obtaining alf_chroma_filter_signal_flag from the bitstream.

Meanwhile, when the chroma array type is a predetermined type (e.g., a monochrome type or a separated type), the decoding apparatus may determine the value of aps_chroma_present_flag to be a value specifying that the chroma related syntax element is not included in the APS NAL unit. When the value of aps_chroma_present_flag is a value specifying that the chroma related syntax element is not included in the APS NAL unit, the decoding apparatus may determine that alf_chroma_filter_signal_flag to be a value specifying that filter information of the chroma component is not signaled without obtaining it from the bitstream.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 22:
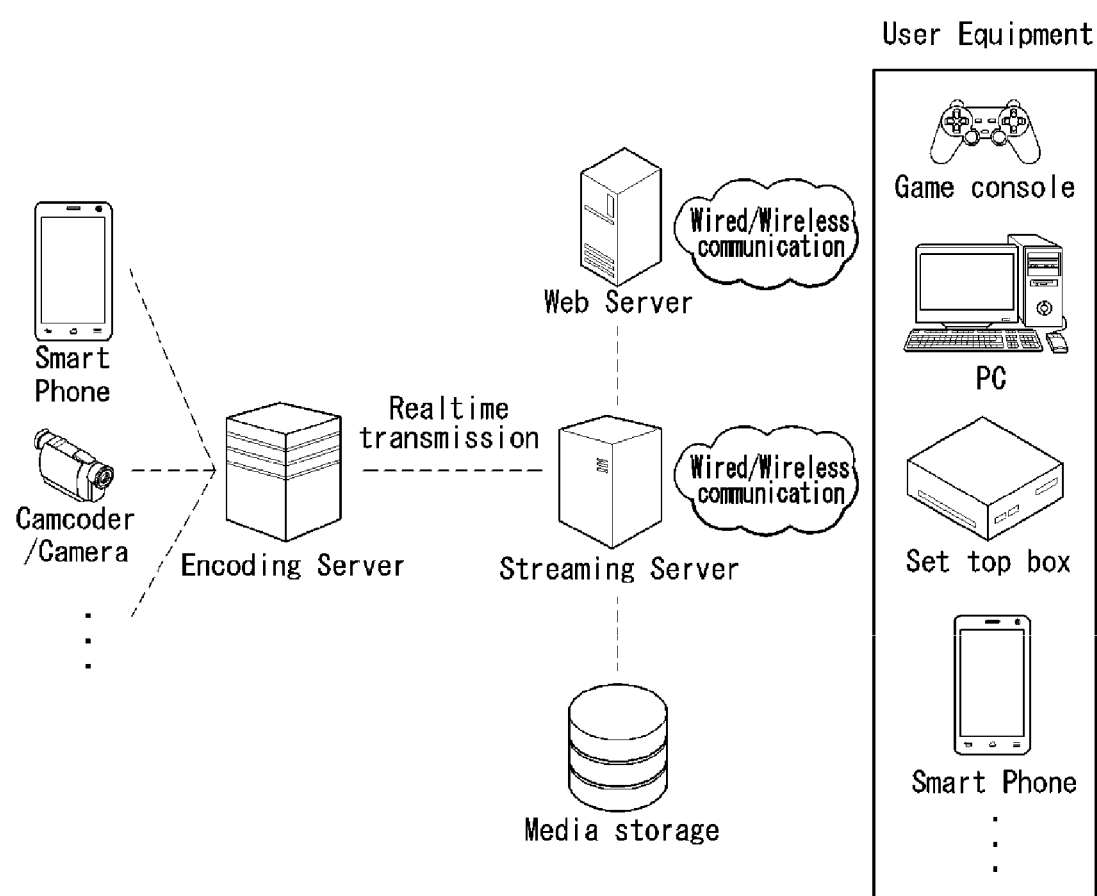
FIG. 22 is a view showing a content streaming system, to which an embodiment of the present disclosure is applicable.

FIG. 22 is a view showing a contents streaming system, to which an embodiment of the present disclosure is applicable.

As shown in FIG. 22, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
   determining a chroma array type of a current image;
   determining an adaptive loop filter (ALF) indicator of a chroma component based on the chroma array type; and
   performing ALF filtering with respect to a reconstructed image based on a value of the ALF indicator,
   wherein the value of the ALF indicator is determined to be a predetermined value without being obtained from a bitstream, based on the chroma array type being a predetermined type, and
   wherein the value of the ALF indicator is obtained from the bitstream, based on the chroma array type being not the predetermined type.

2. The image decoding method of claim 1, wherein the predetermined type is a monochrome type or a separated type in which a chroma component is encoded separately from a luma component.

3. The image decoding method of claim 1, wherein the value of the ALF indicator is determined to be a value specifying that an ALF does not apply to a chroma component, based on the chroma array type being the predetermined type.

4. The image decoding method of claim 1, wherein the performing ALF filtering with respect to the reconstructed image based on the value of the ALF indicator is performed by determining a chroma component, to which an ALF applies, according to the value of the ALF indicator.

5. The image decoding method of claim 1, wherein the ALF indicator is included and signaled in a picture header or slice header of the bitstream, based on the chroma array type being not the predetermined type.

6. The image decoding method of claim 1,
   wherein the ALF indicator is signaled as a first ALF indicator included and signaled in a picture header of the bitstream or a second ALF indicator included and signaled in a slice header of the bitstream, based on the chroma array type being not the predetermined type, wherein the first ALF indicator is determined to be a predetermined value without being obtained from the picture header, based on the chroma array type being the predetermined type, and wherein the second ALF indicator is determined to be a value of the first ALF indicator without being obtained from the slice header, based on the chroma array type being the predetermined type.

7. The image decoding method of claim 1, further comprising determining a value of chroma filter signaling information specifying whether to signal filter information of a chroma component based on the chroma array type.

8. The image decoding method of claim 7, wherein the determining the value of the chroma filter signaling information comprises obtaining, from the bitstream, a value of chroma syntax signaling information specifying whether a chroma related syntax element is included in an APS NAL unit, wherein the value of the chroma syntax signaling information is determined to be a value specifying that the chroma related syntax element is not included in the APS NAL unit, based on the chroma array type being a predetermined type, and wherein the chroma filter signaling information is determined to be a value specifying that filter information of the chroma component is not signaled without being obtained from the bitstream, based on the value of the chroma syntax signaling information being a value specifying that the chroma related syntax element is not included in an APS NAL unit.

9. The image decoding method of claim 7, wherein the chroma filter signaling information is determined to be a value specifying that filter information of the chroma component is not signaled without being obtained from the bitstream, based on the chroma array type being a predetermined type.

10. An image decoding apparatus comprising:
a memory; and
at least one processor, wherein the at least one processor is configured to:
determine a chroma array type of a current image;
determine an adaptive loop filter (ALF) indicator of a chroma component based on the chroma array type; and
perform ALF filtering with respect to a reconstructed image based on a value of the ALF indicator, wherein the value of the ALF indicator is determined to be a predetermined value without being obtained from a bitstream, based on the chroma array type being a predetermined type, and wherein the value of the ALF indicator is obtained from the bitstream, based on the chroma array type being not the predetermined type.

11. An image encoding method performed by an image encoding apparatus, the image encoding method comprising:

determining a chroma array type of a current image; and
generating a bitstream by encoding an adaptive loop filter (ALF) indicator specifying a chroma component to which an ALF applies, based on the chroma array type of the current image, wherein a value of the ALF indicator is not encoded, based on the chroma array type being a predetermined type, and wherein the value of the ALF indicator is encoded, based on the chroma array type being not the predetermined type.

12. The image encoding method of claim 11, wherein an ALF does not apply to a chroma component of the current image, based on the chroma array type being a predetermined type, and wherein the predetermined type is a monochrome type or a separated type in which a chroma component is encoded separately from a luma component.

13. The image encoding method of claim 11, wherein the ALF indicator is included and encoded in a picture header or slice header of the bitstream, based on the chroma array type being not the predetermined type.

14. The image encoding method of claim 11, further comprising determining whether to signal filter information of a chroma component based on the chroma array type.

15. A method of transmitting a bitstream generated by the image encoding method of claim 11.

* * * * *